(12) United States Patent
Cope

(10) Patent No.: US 10,731,834 B1
(45) Date of Patent: Aug. 4, 2020

(54) ATTACHABLE TRANSVERSELY SLIDING LIGHT

(71) Applicant: Candice L. Cope, Godfrey, IL (US)

(72) Inventor: Candice L. Cope, Godfrey, IL (US)

( * ) Notice: Subject to any disclaimer, the term of this patent is extended or adjusted under 35 U.S.C. 154(b) by 0 days.

(21) Appl. No.: 16/658,267

(22) Filed: Oct. 21, 2019

(51) Int. Cl.
  *F21V 21/088* (2006.01)
  *F16M 11/08* (2006.01)
  *F16M 13/02* (2006.01)
  *A61G 5/10* (2006.01)
  *F21Y 115/10* (2016.01)

(52) U.S. Cl.
  CPC .............. *F21V 21/088* (2013.01); *A61G 5/10* (2013.01); *F16M 11/08* (2013.01); *F16M 13/02* (2013.01); *F21Y 2115/10* (2016.08)

(58) Field of Classification Search
  CPC ......... F21V 21/088; A61G 5/10; F16M 11/08; F16M 13/02; F21Y 2115/10
  See application file for complete search history.

(56) References Cited

U.S. PATENT DOCUMENTS

| 5,477,443 | A | | 12/1995 | Cvek | |
| 5,772,315 | A | * | 6/1998 | Shen | F21V 21/08 362/249.07 |
| 6,152,583 | A | * | 11/2000 | Langner | F21V 21/30 362/427 |
| 7,798,682 | B1 | * | 9/2010 | Cvek | F21V 23/04 362/410 |
| 2007/0103906 | A1 | * | 5/2007 | Wang | F21V 19/008 362/277 |
| 2008/0186699 | A1 | * | 8/2008 | Saez | F21S 8/00 362/191 |

FOREIGN PATENT DOCUMENTS

| CN | 201983080 | U | * | 9/2011 | ............. F21V 21/26 |
| CN | 202345523 | U | * | 7/2012 | |
| CN | 205485218 | U | * | 8/2016 | |
| CN | 205625319 | U | * | 10/2016 | |
| CN | 106931361 | A | * | 7/2017 | |

* cited by examiner

*Primary Examiner* — Isiaka O Akanbi
*Assistant Examiner* — Glenn D Zimmerman
(74) *Attorney, Agent, or Firm* — Sanchelima & Associates, P.A.; Christian Sanchelima; Jesus Sanchelima

(57) ABSTRACT

An attachable transversely sliding light including a rod assembly, a holding assembly, a housing assembly and a light assembly is disclosed. The attachable transversely sliding light is mountable onto chairs of all dimensions due to the rod assembly, which extends and retracts to cooperate with chairs of various dimensions. At each end of the rod assembly is a holding assembly mounted thereon, which allows the attachable transversely sliding light to be secured onto a chair. Mounted onto the rod assembly is the housing assembly which slides along the length of the rod assembly to position the housing assembly and light assembly mounted thereon in a position that is optimal to illuminate the user and the surrounding area. The housing assembly houses a battery and has the light assembly extending therefrom. The light assembly can be manipulated into a position that best suits the needs of the user.

11 Claims, 5 Drawing Sheets

ATTACHABLE TRANSVERSELY SLIDING LIGHT

BACKGROUND OF THE INVENTION

1. Field of the Invention

The present invention relates to an attachable transversely sliding light and, more particularly, to an attachable transversely sliding light that is capable of being transversely mounted to chairs of all dimensions that allows a user to position the light as may be best suited for the particular chair.

2. Description of the Related Art

Several designs for attachable transversely sliding lights have been designed in the past. None of them, however, include a tracked lamp having clamps on either end specifically structured for attaching to a chairback. Further, the clamps in either end of a track in combination with a lateral slotted track, articulating lamp and LEDs are not disclosed in any prior art There is often a need to illuminate a surrounding area in order to better see the surroundings and the tasks at hand. It may be best to have the light to shine from overhead when a person is reading, for example. However, that may not be possible because of the current position of lights in the home of a person or because of the position of the seating area in which the person may find themselves in. Hence, there is a need for a light that can be freely attached and detached to chairs of any dimensions that can be positioned as a user wishes. The ability to customizable positions or angles at which the light shines down may facilitate seeing and allows the needs of all users to be met. It is essential for all seating areas or chair to be able to be illuminated which the present invention aims to achieve.

Applicant believes that a related reference corresponds to U.S. Pat. No. 5,477,443 issued to Sava Cvek for Halogen Lamp. It is a lamp assembly which includes a base, a lamp arm mounting adapter on the base for pivotally mounting a lamp arm thereto, with the lamp arm itself having a first pair of hollow support tubes mounted on the adapter for pivotal movement on a vertical axis in a generally horizontal plane and a having an arm support pivotally mounted on their opposite ends for pivotal movement on a vertical axis on a horizontal plane. However, it differs from the present invention because the Cvek reference is more cumbersome. The Cvek reference can slide but it is mounted vertically to travel horizontally which limits the height vertically at which the light can be positioned. Further, the present invention is capable of being mounted onto chairs of any and all dimensions as it is removably attached while the Cvek reference is more difficult to attach and detach quickly.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an attachable transversely sliding light that slides along a track to allow for different positioning of the light, both vertically and horizontally, for optimal lighting to be achieved.

It is another object of this invention to provide an attachable transversely sliding light that can be mounted onto chairs of all sizes and dimensions.

It is still another object of the present invention to provide an attachable transversely sliding light that is easy and quick to assemble and dissemble.

It is another object of the present invention to provide an attachable transversely sliding light that is portable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
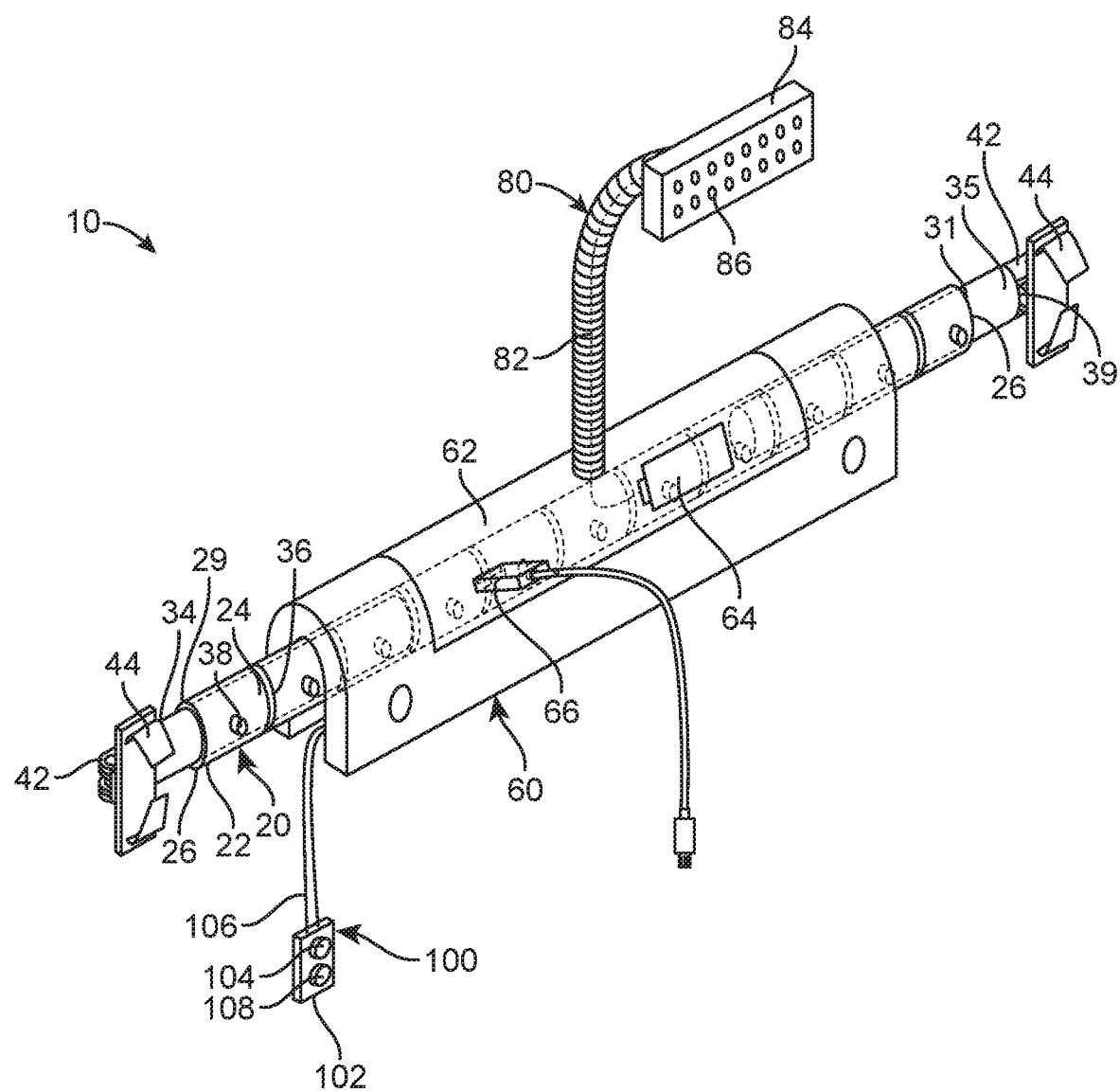
FIG. 1 represents an isometric view of the present invention.

Referring now to the drawings, where the present invention is generally referred to with numeral 10, it can be observed that it, an attachable transversely sliding light 10, basically includes a rod assembly 20, a holding assembly 40, a housing assembly 60, a light assembly 80, a remote assembly 100 and a chair assembly 120.

There is often a need when sitting down in a seating area to use light to illuminate the surrounding area. This may be especially needed when sitting down to read a book or when knitting, for example. There are countless other situations in which light may be necessary to properly complete a task. However, it may not be possible to bring light to the seating area due to structure of the seating area or because light is simply not accessible in the particular seating area. Hence, there is a need for an attachable transversely sliding light that can be attached to various sized chairs and that is also portable.

Figure 2:
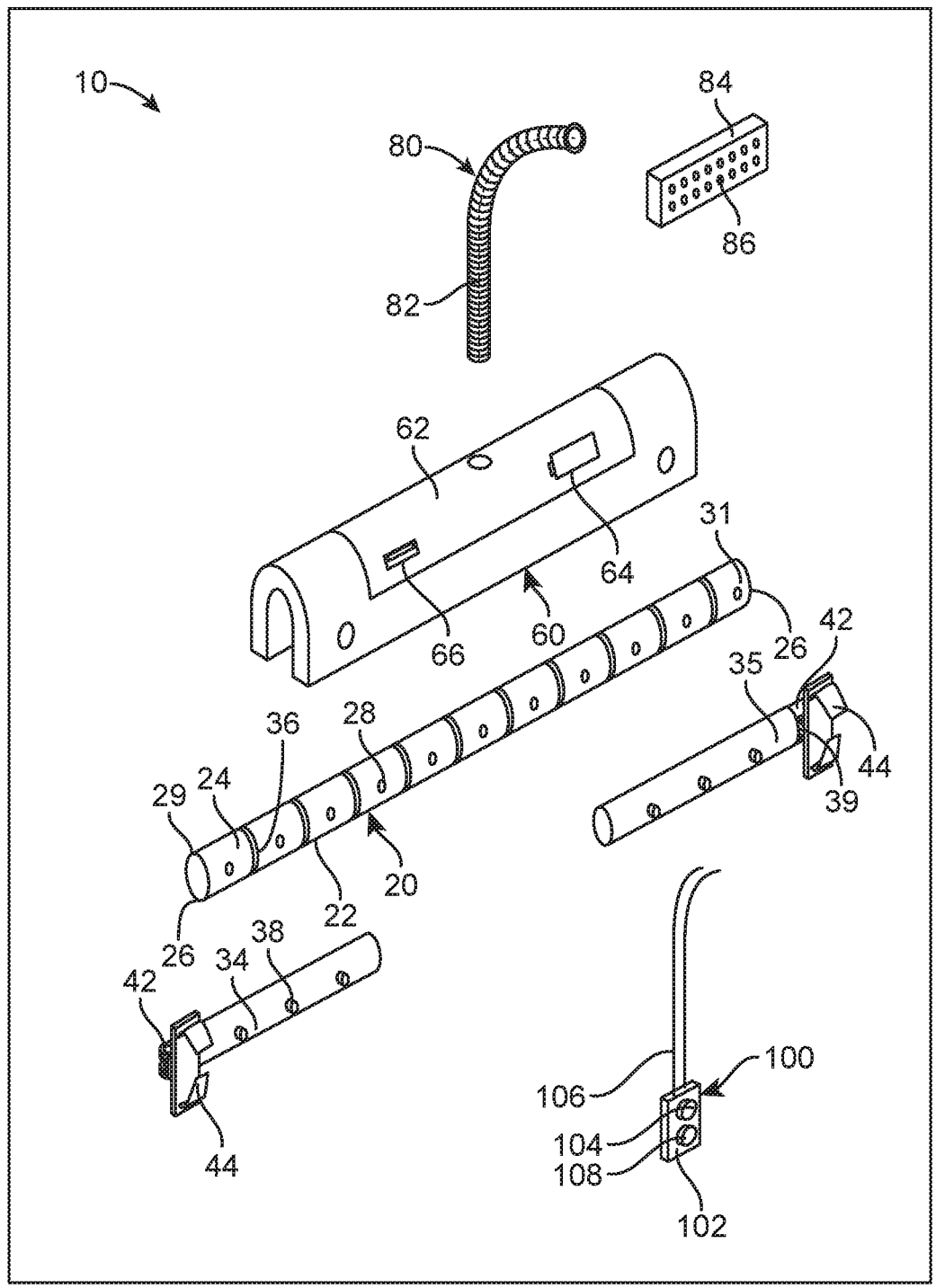
FIG. 2 is an exploded view of the present invention.
Figure 3:
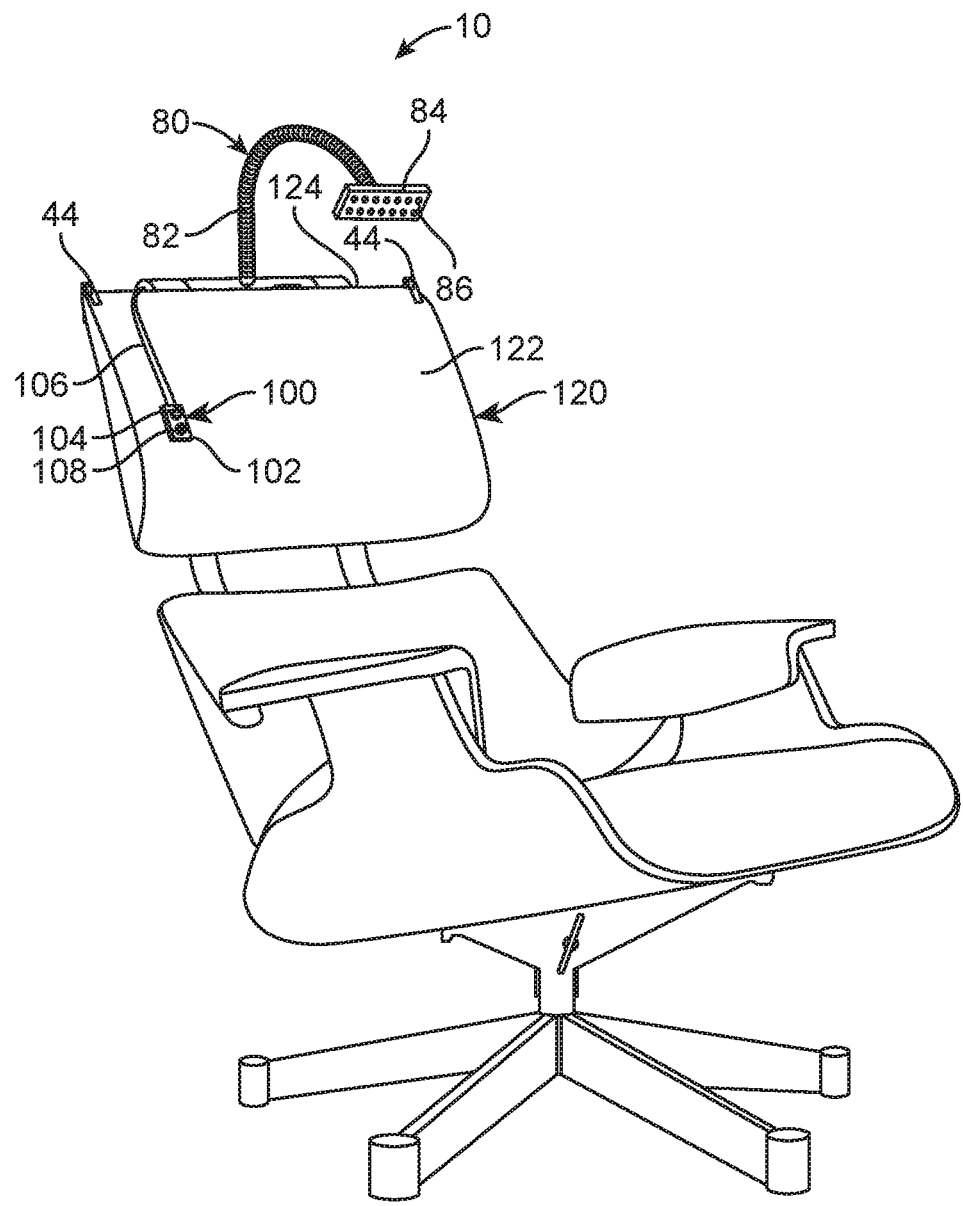
FIG. 3 shows the present invention mounted on a chair.
Figure 4:
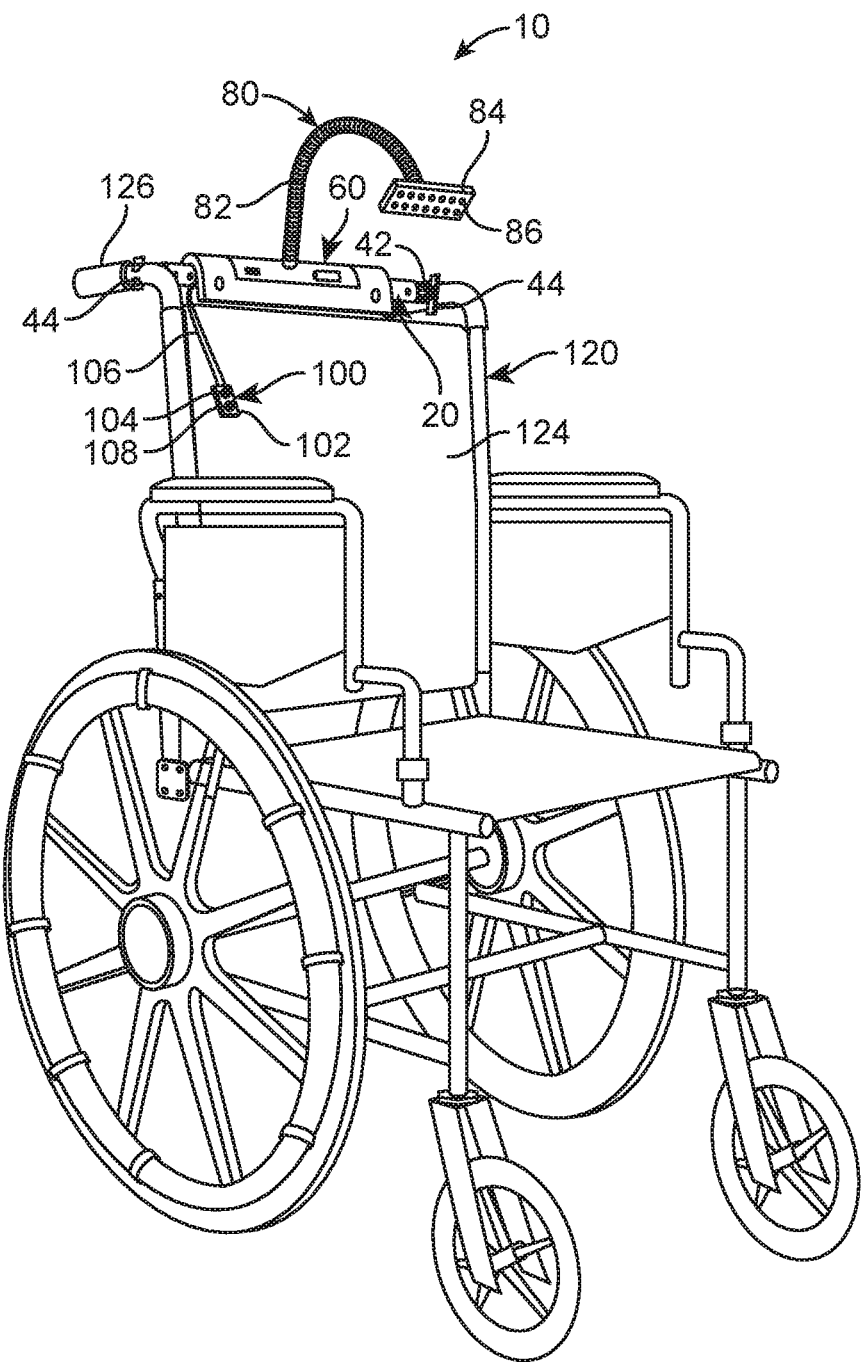
FIG. 4 shows the present invention mounted onto a wheelchair.
Figure 5:
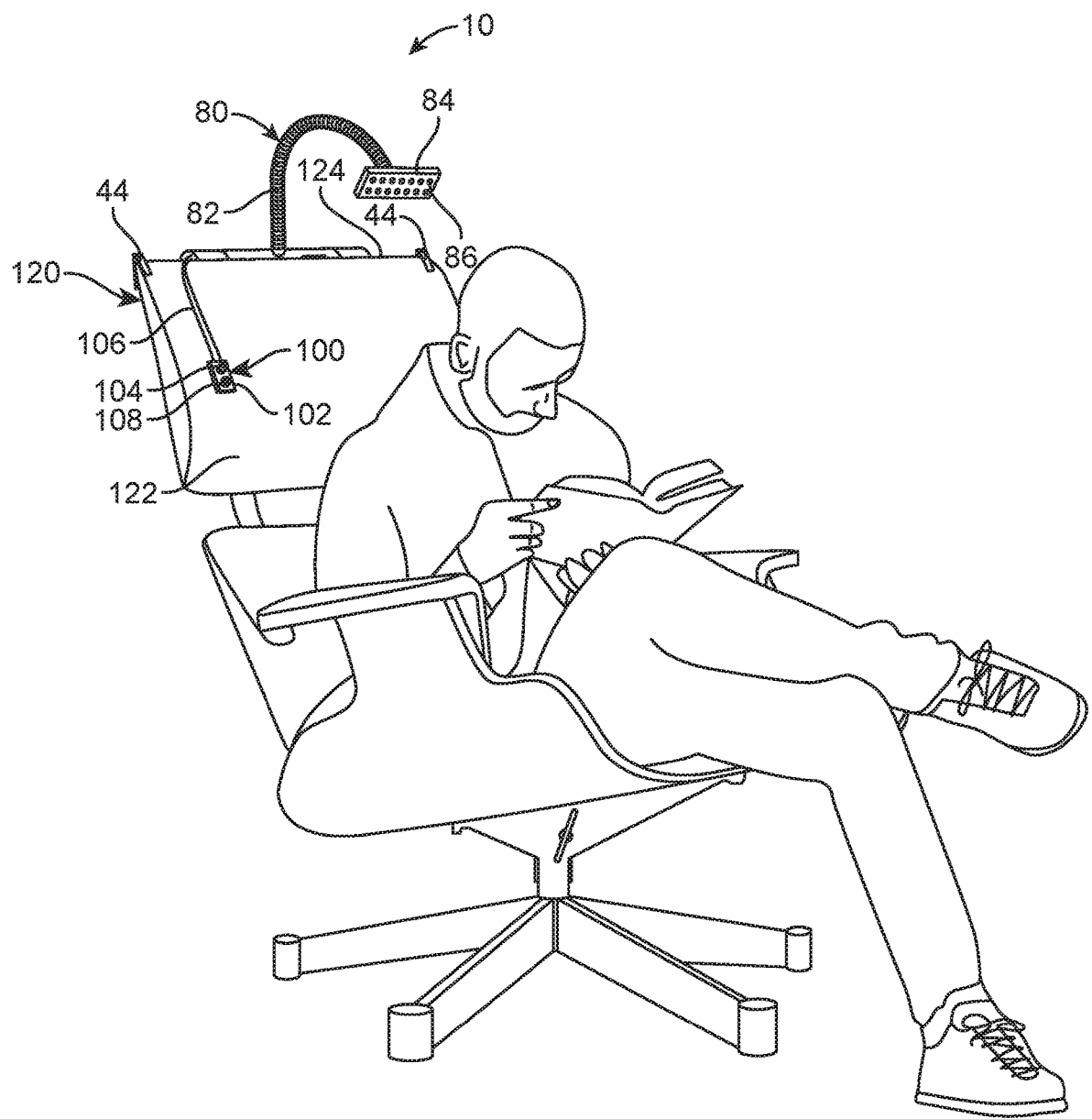
FIG. 5 illustrates the present invention mounted to a chair in an operational setting where a user is having the present invention shine light down on them.

It can be seen in FIGS. 1-4, attachable transversely sliding light 10 is depicted in an immediate embodiment. Rod assembly 20 importantly includes an outer rod 22 and inner rods 33. Outer rod 22 may include an outer rod body 24. In one embodiment, outer rod body 24 may be elongated and cylindrical in shape. Outer rod 22 and outer rod body 24 may be of predetermined dimensions. Outer rod body 24 may include a plurality of openings 28 at predetermined locations along a length of outer rod body 24. Openings 28 may be evenly spaced apart and be of predetermined dimensions. It should be noted that outer rod 22 may preferably be hollow. Further, outer rod 22 may include a distal end 29 and a distalmost end 31 at which side openings 26 may be found which allow access to the hollow interior of outer rod 22.

Outer rod 22 may be a track or a lateral slotted track, that allows for a path for components of the present invention to travel along. As outer rod 22 may be a slotted track, thereon outer rod body 24 may be grooves 36 evenly spaced apart. Grooves 36 may be slightly recessed cuts thereon outer rod body 24. Each of grooves 36 may extend along a circumference of outer rod 22 and more specifically outer rod body 24.

Rod assembly 20 may further include inner rods 33 located therein outer rod 22. Inner rods 33 may include a first rod 34 and a second rod 35. First rod 34 and second rod 35 may be identical to one another. Inner rods 33 may be of predetermined dimensions and shapes. Preferably, inner rods 33 may be of dimensions that cooperate with fitting therein the hollow interior of outer rod 22. Each of inner rods 33 may include a push button 38 at predetermined locations that correspond with the openings 28 as push button 38 may be inserted and protrude therethrough openings 28. Push button 38 may be evenly spaced apart and of predetermined dimensions. Push button 38 may be inserted through openings 28 and pushed inwardly when there is a need to adjust the positioning and fitting of inner rods 33. Inner rods 33 are adjusted to allow for retrofitting of the present invention onto different chairs of varying dimensions. With inner rods 33 the length of the present invention is adjusted. Each of first rod 34 and second rod 35 may be adjusted independently. To adjust each of inner rods 33 a user pushes push button 38 found on first rod 34 and second rod 35 inwardly and slides each of inner rods 33 either inwardly or outwardly from outer rod 22. The movement for adjusting of inner rods 33 may occur horizontally within outer rod 22. To lengthen the present invention inner rods 33 may be expanded outwardly within outer rod 22. To shorten the present invention, inner rods 33 may be retracted inwardly within outer rod 22. Inner rods 33 may be moved inwardly and outwardly within outer rod 22 until a different one of openings 28 is reached that corresponds with the desired length of the present invention.

The present invention may be mounted onto a chair 122 of chair assembly 120. Chair 122 may be one of a rocking chair, wheel chair, a sofa chair, or any other variation of chairs that permit a user to sit thereon. More specifically, the present invention may be mounted onto a chair top rail 124 of chair 122. To be able to mount and attach the present invention onto chair 122 holding assembly 40 may be used. Holding assembly 40 may be mounted thereon a inner rod distal end 39 of inner rods 33. Holding assembly 40 may include at least one swiveling hinge 42 thereon each inner rod distal end 39 of first rod 34 and second rod 35. Mounted thereon at least one swiveling hinge 42 may be an at least one clamp 44. At least one swiveling hinge 42 allowing at least one clamp to be able to rotate 180 degrees. More specifically, at least one clamp 44 may be mounted onto at least one swiveling hinge 42 at inner rod distal end 39 of first rod 34 and second rod 35. In one embodiment, at least one clamp 44 may be located above or below out rod 22. At least one clamp 44 may be adapted to attach to chair top rail 124. At least one clamp 44 secures the present invention onto chair 122 and also permits retrofitting the presenting onto different chairs. With at least one swiveling hinge 42 each of at least one clamp 44 may be made to face a forward direction, outward direction and a backward direction if necessary, as at least one swiveling hinge 42 may face a corresponding direction as well. The ability of at least one swiveling hinge 42 to be able to rotate and pivot allows for mounting the present invention to chair 122 that may not include chair top rail 124. At least one swiveling hinge 42 allows for at least one clamp 44 to be mounted thereon arms 126 of chair 122, for example. In one embodiment, chair 122 may be a wheelchair and arms 122 thereof may be the pushing arms which extend rearwardly from the wheelchair. It may be suitable for holding assembly 40 to be mounted onto different components of chair 122. At least one clamp 44 may be mounted thereon holding assembly 40 with fasteners or the like as known in the art such as welding, hook and loop straps, snap buttons, nails, threaded fasteners, for example. In one embodiment, at least one clamp 44 may be integral to holding assembly 40.

The present invention further includes housing assembly 60. Housing assembly 60 may be adapted to house electrical components of the present invention, in one embodiment. Housing assembly 60 may include a housing body 62 that is mounted to outer rod 22. Housing body 62 may be of a shape that cooperates with being mounted adjacent to outer rod 22. It may be preferable for housing body 62 to be U shaped. It may be preferable for housing body 62 to be mounted atop of outer rod 22. Housing body 62 may be secured by being attaching means being connectors or connecting pieces that partially attach to outer rod 22. Housing body 62 may slide along the length of outer rod 22 and be secured in place by sliding onto grooves 36. In one embodiment, housing body 62 may include male members that engage grooves 36. Housing assembly 60 may further include a battery 64 and a charging port 66 housed therein housing assembly 60. Battery 64 may be adapted to provide power to components of light assembly 80. Battery 64 may be rechargeable. It may be possible to recharge battery 64 through power supplied through charging port 66 with a charging cable 68 that may be directly connected to a power supply. Housing assembly 60 may further house components that permit functionally to light assembly 80.

Attachable transversely sliding light 10 may further include light assembly 80. Light assembly 80 may be adapted to illuminate a surrounding area of the user. Light assembly 80 may be connected to battery 64 to receive sufficient power thereof to provide the lighting needed. Light assembly 80 may include a gooseneck 82 extending therefrom housing body 62 of housing assembly 60. Gooseneck 82 may preferable be flexible yet maintain shape. Thereby meaning that it may be possible to adjust gooseneck 82 to best position it as desired and have it stay secured in position. Gooseneck 82 may be of predetermined dimensions and shape. Gooseneck 82 may include a gooseneck distalmost end 83 having a lamp head 84 mounted thereon. Lamp head 84 may be of predetermined shape and dimensions. Importantly, lamp head 84 should have a large surface area to hold a plurality of lights 86 thereon. Lights 86 may be adapted to provide lighting to a dark area. Lights 86 illuminate the desired area that gooseneck 82 is positioned to aim at. Lights 86 may be led lights or the like as known in the art of illumination. It should be understood that along the length of gooseneck 82 may be a light wire 88 that connects battery 64 to lights 106 for providing electrical power thereof. It may be suitable for light wire 88 to run the length of gooseneck 82 either inside of gooseneck 82 or adjacent along gooseneck 82.

To control light assembly 80 the present invention may include remote assembly 100. Remote assembly 100 may be connected to battery 84 and lights 86. Remote assembly 100 may include a remote 102, a power button 104 and an electrical wire 106. Remote 102 may be adapted to turn lights 86 on and off through the usage of power button 104. Power button 104 may be pressed and depressed for activation and deactivation, respectively, of lights 86 thereof. As such, electrical wire 106 may extend from remote 102 to battery 84 and lights 86. In one embodiment, remote 102 may include a button or switch for controlling the intensity of lights 86 such as a light button 108.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An attachable transversely sliding light, comprising:
   a. a chair assembly including a chair having a chair top rail;
   b. a rod assembly having an outer rod and inner rods, said outer rod having an outer rod body with side openings on lateral sides thereof and openings evenly spaced apart on a front side thereof extending a length of said outer rod body, said outer rod body having a distal end and a distalmost end, said inner rods further defined by a first rod and a second rod, said first and second rod extending outwardly from said side openings, said first and second rod having a push button thereon to allow for different sizing of said rod assembly for mounting onto different sized chairs by extending or retracting of said first and second rod and securing said push button into said openings, said inner rods having an inner rod distal end;
   c. a holding assembly including at least one swiveling hinge mounted thereon said inner rod distal end of said first rod and said second rod, said at least one swiveling hinge having at least one clamp mounted thereon, said at least one swiveling hinge allowing for said at least one clamp to be able to rotate 180 degrees;
   d. a housing assembly including a housing body having a battery therein;
   e. a light assembly mounted thereon said housing assembly, said light assembly includes a gooseneck mounted on said housing body on a proximal end thereof and a lamp head on a distal end, said lamp head having a plurality of lights mounted thereon to emit light towards said chair, said plurality of lights being connected to said battery by a wire extending therethrough said gooseneck to provide power to said plurality of lights; and
   f. a remote assembly including a remote having a power button for powering said plurality of lights on and off, said remote including a light wire interconnecting said plurality of lights with said remote for communication thereof to allow controlling of said plurality of lights.

2. The system of claim 1, wherein said outer rod body includes grooves along said length of said outer rod body, said grooves being evenly spaced apart.

3. The system of claim 1, wherein said housing assembly slides along said outer rod and is secured by said grooves when desired position is achieved.

4. The system of claim 1, where said housing body is U shaped.

5. The system of claim 1, wherein said battery is rechargeable.

6. The system of claim 1, wherein said plurality of lights are LED lights.

7. The system of claim 1, wherein said gooseneck is flexible to be positioned as a user desires.

8. The system of claim 1, wherein said lamp head is rectangular shaped.

9. The system of claim 1, wherein said remote includes a light button for controlling the intensity of light being emitted by said plurality of lights.

10. The system of claim 1, wherein said chair is a wheelchair and said at least one clamp are rotated outwardly to grasp onto arms of said wheelchair which are rearwardly extending therefrom.

11. The system of claim 5, wherein said battery is recharged thorough a charging port located thereon said housing assembly and powered by a charging cable connected thereto said charging port on one end and a power source on an opposite end.

\* \* \* \* \*